Oct. 30, 1923.
L. M. HARVEY
FRUIT CLIPPER
Filed May 27, 1920
Fig.1
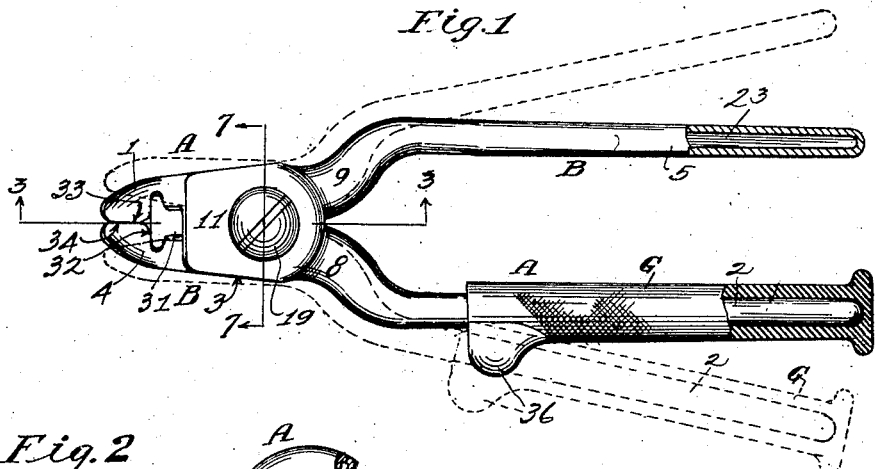
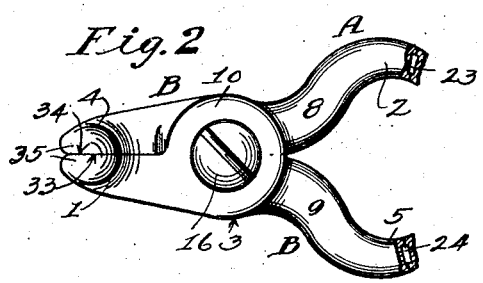
Fig.2
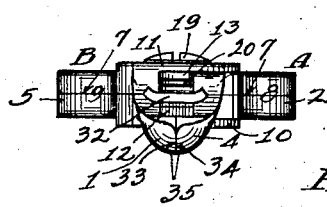
Fig.5
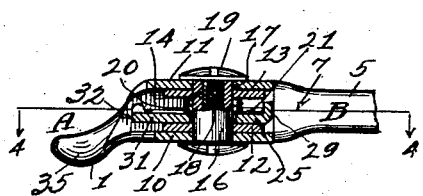
Fig.4   Fig.3
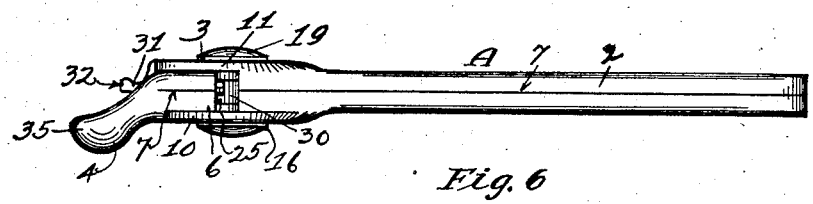
Fig.6
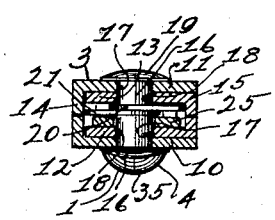
Fig.7
INVENTOR.
Leo M Harvey
By Arthur L Mead
Attorney.

Patented Oct. 30, 1923.

1,472,392

UNITED STATES PATENT OFFICE.

LEO M. HARVEY, OF LOS ANGELES, CALIFORNIA.

FRUIT CLIPPER.

Application filed May 27, 1920. Serial No. 386,359.

*To all whom it may concern:*

Be it known that I, LEO M. HARVEY, a citizen of the United States, and a resident of Los Angeles, in the county of Los Angeles, State of California, have invented new and useful Improvements in Fruit Clippers, of which the following is a specification.

This invention relates to clippers for fruit and the like and is especially useful for clipping citrus fruits, including oranges, lemons, etc., from their stems without in any manner injuring the tender skins, which, if damaged in the picking or clipping will render the fruit unmarketable and subject to rot and deterioration. The main object, therefore, of my invention is to provide a clipper of simple construction, light weight and convenient size and form which may be held in the hand conveniently while the fruit is being clipped from the stems and which is adapted to facilitate the clipping operation in every possible manner.

It will be understood that in practice fruit such as oranges, apples, lemons, etc., is wrapped in paper and packed tightly in crates, or boxes for convenience in handling and for the purpose of shipping, and it is desirable that the stems of the fruit should be short enough to prevent their contact with the skins, and at the same time it is desirable that the stems should not be so short as to expose the meat of the fruit to the atmosphere as would occur when the stems were entirely removed from the fruit or too short or broken, as it is necessary to preserve the fruit from deterioration as long as possible.

In clipping the fruit from the stems the skin may be easily broken by contact with the metal parts of the clippers should the clipper jaws be improperly positioned or have any sharp edges which would touch the skin of the fruit. Another object is to provide means for engagement with the stems of the fruit, and separate from the jaws of the clippers, which will prevent the improper positioning of the clippers and limit the position of the jaws over the stem pits. Other objects may appear as the description progresses.

I have illustrated a preferred embodiment of my invention in the drawings hereto appended and forming a part of this application, in which I have used similar characters of reference for indicating the same or like parts. In said drawings:

Fig. 1 is a plan view of the clippers in closed position, the open position being indicated in broken lines.

Fig. 2 is a bottom view of the clipper jaws.

Fig. 3 is a section of the same on line 3—3 of Fig. 1.

Fig. 4 is a section of the same on line 4—4 of Fig. 3.

Fig. 5 is a front end view of the clippers.

Fig. 6 is a side view of the same.

Fig. 7 is a section of the same on line 7—7 of Fig. 1.

In order to provide clippers of light weight and convenient form I prefer to form the clippers of two main integral parts, each having a single clipping jaw and a handle and said main members are initially formed of sheet metal and welded together at the meeting edges so as to provide a structure of substantially rectangular cross section, and one of said members is made slightly narrower at their point of attachment in order that a single pin or screw may be employed for holding the members together for use. These main members are represented in the drawings by characters A and B. Member A has a jaw 1, a hollow handle 2, and an intermediate body portion 3. Likewise member B has a jaw 4, a handle 5 and a body portion 6 and both members are, as stated formed of sheet metal halves joined together at line 7 by welding material so as to form integral hollow parts. The handles 2 and 5 are similarly formed and taper slightly from the body portions 3 and 6 to their outer ends and have curved portions 8 and 9, respectively, close to said body portions while the handle grips are preferably straight and are adapted to be parallel when the jaws are closed, as shown in full lines in Fig. 1.

Member A has spaced flat sides 10 and 11 between which similar but smaller spaced flat sides 12 and 13 of member B are adapted to fit and a connecting web 14 joins the sides 10 and 11 of member A together while a web 15 joins the sides 12 and 13 in a similar manner. When said members are attached together for use the member B is slipped through the opening of the body of member A until the sides 12 and 13 thereof register centrally with the sides 10 and 11 of member A, and a fulcrum pin 16 is inserted through corresponding bores 17 and 18, respectively, in the opposite sides of the two members and is held therein by means of a retaining screw 19 which is threaded into the end of said pin.

A wire spring 20 is coiled around the pin 16 between the sides 12 and 13 of member B and the ends 21 and 22 thereof are extended into the hollows 23 and 24, respectively, of the handles of the main members A and B so as to hold the jaws 1 and 4 and handles 2 and 5 normally spaced apart to their fullest extent.

A limiting member 25 is also held on the pin 16 and has notches 26 and 27 formed between upturned lips 28, 29 and 30 for receiving the ends 21 and 22 of the spring 20, whereby the turning of the member 25 may be prevented on said pin, and an extension 31 is formed on said limiting member and projects forwardly of the body portions of members A and B and has a transversely disposed edge 32 for engagement with the fruit stems so as to limit the movement of the clippers over the stem pits of the fruit. Said member rests upon the lower side of the member B and the spring 20 rests thereupon, as clearly shown in the drawing.

It will be noted that the jaws 1 and 4 have straight cutting edges 33 and 34, respectively, which are parallel and in contact when the jaws are closed, as shown in Fig. 1, and the cutting portions thereof are bowled, or cupped, as at 35 so as to render the jaws readily insertible into the depression around the stems of the fruit in order that a close cut of the stems may be made.

One of the handles, either of member A or B, as the case may be, may have a grip G of rubber or the like which is molded to fit the straight portion of the handle and is provided with a knob or abutment 36 adapted to be engaged by the thumb of the hand when held in proper position for use of the clippers. The surface may be roughened as indicated so that a firm grasp thereof may be had and said gripping member may be readily removed from the handle for any purpose.

In the use, the handles of the members A and B are grasped firmly in the hand of the operator and the jaws being normally open, the clippers are adjusted to the stem of the fruit to be clipped in such a manner that the bowl of the jaws will rest in the depression at the root of the stem while the body of the clippers will rest lightly upon, or be held slightly out of contact with the fruit. The jaws are moved over the fruit so that the member 25 will touch the stem and the closing of the jaws against the tension of the spring 20 will effect the cutting of the stem close to the root and yet without any damage being done to the fruit.

The flat faces of the sides of the members A and B serve to hold the cutting jaws perfectly parallel and in alinement and the removal of the fulcrum pin 16 permits of the ready disassembling of the tool for any purpose by unskilled persons.

I may modify the form of my device from that shown within the scope of the appended claims without departing from the spirit of my invention or enlarging the scope thereof.

What I claim is:

1. An implement of the character described embodying relatively movable members provided with clipping jaws at one of their ends and handles at their other ends, the intermediate portions thereof being enlarged and having cavities therein, the cutting edges of said jaws being cupped for insertion into the stem pit of fruit, a stop member held stationary in the cavities of said members and having a forwardly projecting lip with an edge extending transversely of said cutting edges, for limiting the adjustment of the implement relative to the fruit stems in a clipping operation, and a spring having the end portions thereof engaging said handles, and the intermediate portions thereof engaging portions of said stop member for holding said stop member in operative position when the jaws are open, and for holding said jaws normally closed.

2. An implement of the character described including a pair of relatively movable members hingedly connected together at a point nearer one extremity than the other and having enlarged hollow body portions, handle extensions integrally formed on said members, clipping jaws integral therewith and on the opposite extremities of said members from said handles, said jaws being extended downwardly and outwardly from the plane of said handles and having meeting cutting edges disposed in the plane of the longitudinal axis of the implement when said jaws are closed, said cutting edges having cupped portions formed in the outer extremities thereof, a stop member stationarily held between said members and having an extension disposed transversely of and projecting outwardly beyond the opposite cutting edges, and a spring having the end portions thereof engaging said handles, and the intermediate portions thereof engaging portions of said stop member for holding said stop member in operative position when the jaws are open, and for holding said jaws normally closed.

3. An implement of the character described including a pair of relatively movable members hinged together at a point intermediate their extremities and provided with handles and cutting jaws on opposite sides of the hinge, a flat stop member held between said members and on said hinge and provided with a forward extension with an edge disposed transversely of the cutting edges of said jaws, the rear edge of said stop member being upturned and provided with a plurality of notches, a spring coiled around said hinge and having its free ends extended through said notches and projecting into said handles, for holding said stop member stationary when said jaws are opened and closed said spring serving to hold said jaws normally closed.

4. An implement of the character described including a pair of hollow and relatively movable members having central body portions, cutting jaws integrally formed at one side of said body portions and handles on the opposite sides thereof, a pin for hingedly connecting the body portions of said members together, a stop member held on said pin and having an extension projecting forwardly through said body portions and overlying said cutting jaws and disposed at right angles thereto, and a spring adjustably arranged for connection with said stop member for normally holding said jaws closed.

5. An implement of the character described comprising a pair of relatively movable cutting members, a pin connecting said members together for movement, a stop member held on said pin, said members having paired cutting jaws downwardly and outwardly extended and having meeting cutting edges, said stop member having an extension projecting through said members and having a transversely disposed portion overlying said cutting edges, said stop member having an enlarged portion held on said pin, and a spring also held on said pin and having the end portions thereof engaging said cutting members and the intermediate portions thereof engaging the enlarged portion of said stop member, for the purpose described.

LEO M. HARVEY.

Witnesses:
 CHARLES N. MONTGOMERY,
 LUTHER L. MACK.